J. P. BARTHOLOMEW.
TOOL CHUCK.
APPLICATION FILED JAN. 20, 1909.
927,478.
Patented July 13, 1909.
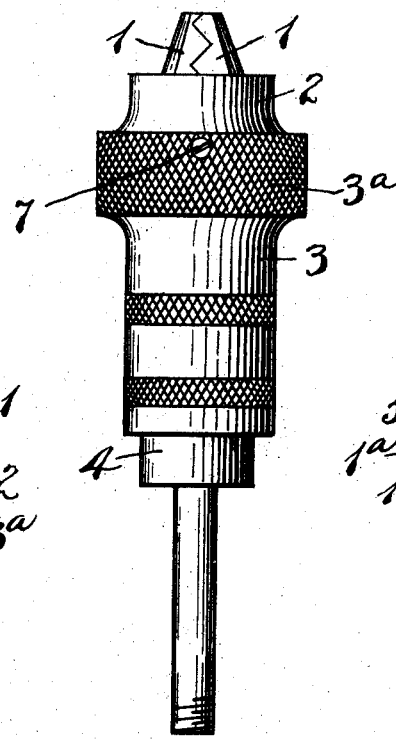
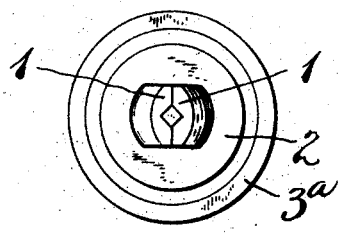
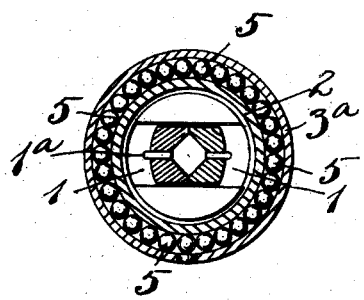
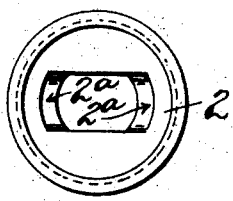
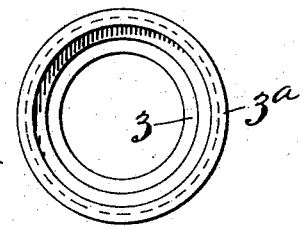
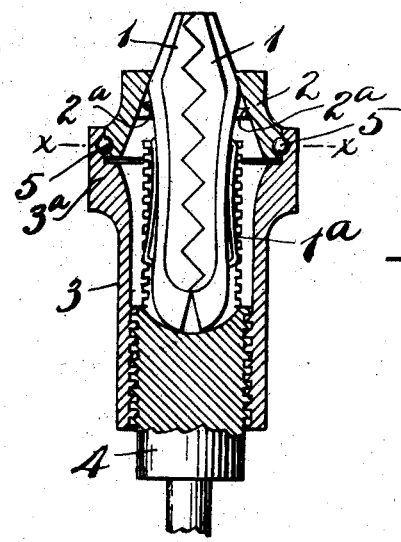
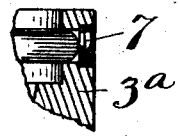
Witnesses:
Chas. W. Pead
Fred M. Dannenfelser
Inventor
J. P. Bartholomew
By his Attorneys
Bartlett, Brownell & Mitchell

UNITED STATES PATENT OFFICE.

JOSEPH PEEK BARTHOLOMEW, OF BRISTOL, CONNECTICUT, ASSIGNOR TO THE STANLEY RULE & LEVEL COMPANY, OF NEW BRITAIN, CONNECTICUT, A CORPORATION OF CONNECTICUT.

TOOL-CHUCK.

No. 927,478.  Specification of Letters Patent.  Patented July 13, 1909.

Application filed January 20, 1909. Serial No. 473,281.

*To all whom it may concern:*

Be it known that I, JOSEPH P. BARTHOLOMEW, a citizen of the United States, residing at Bristol, county of Hartford, State of Connecticut, have invented certain new and useful Improvements in Tool-Chucks, of which the following is a full, clear, and exact description.

My invention relates to improvements in tool chucks.

In the particular form of my invention described herein, I have illustrated and referred to that type of a chuck adapted for the well known bit-brace.

The object of the invention, broadly speaking, is to provide improved anti-friction construction for the bit-brace jaws whereby the operator may by the hand alone cause the jaws to grasp the tool very tightly.

In the accompanying drawings, Figure 1 is a side elevation of my invention as embodied in a chuck for a bit-brace. Fig. 2 is a longitudinal section thereof. Fig. 3 is a plan view of the upper end of the chuck. Fig. 4 is a section on the line $x$—$x$ Fig. 1. Fig. 5 is a view of the inner end of the chuck head, said part being removed. Fig. 6 is a view of the outer end of the chuck operating sleeve, the other parts being detached. Fig. 7 is a detail view on a relatively enlarged scale, shown partly in section.

The chuck in its preferred form embodies the jaws 1—1, the head 2, the operating sleeve 3, and the driver 4. In this particular form the jaws are arranged in a groove cutting into the forward end of the driver 4 in the usual manner, so that as the driver 4 is revolved, the jaws 1—1 will be likewise revolved therewith and thereby. The operating sleeve 3 is secured by thread connection to the driver 4. The head 2 is secured to the operating sleeve 3 in a unique manner, as by means of a special arrangement of ball bearings. The head 2, although held against longitudinal movement relatively to sleeve 3, may nevertheless rotate with the utmost freedom relatively thereto, for the purpose hereinafter described.

The anti-friction or ball-bearing comprises balls 5—5 arranged in an annular ballrace corresponding in cross-section to the circumference of one of said balls, one-half of said race being formed in the annular wall of the head 2, while the other half is formed in the adjacent annular wall of the operating sleeve 3. In this particular form that part of the sleeve 3, in which one half of the race is formed, surrounds that part of the head in which the other half of said race is formed. By this arrangement an enlarged gripping portion $3^a$ may be formed whereby the operator may grasp the sleeve 3 firmly, and with sufficient leverage to turn the same until the jaws 1—1 firmly grip the tool.

The head 2 preferably has recesses at its inner side as at $2^a$, conforming to the outline of the jaws 1—1 as they pass therethrough and the outer wall of each of said recesses is beveled (as best seen in Fig. 2) to provide a taper or incline to cause each jaw to move toward the other as the sleeve 3 is turned down on the driver 4.

$1^a$ is the usual spring which may be provided to normally cause the free outer ends of the jaws 1—1 to open up as the sleeve 3 is unscrewed from the driver 4. The outer side of the outer end of each jaw is preferably formed on a bevel, as best seen in Figs. 1 and 2, to correspond substantially with the beveled wall of its adjacent recess $2^a$.

To facilitate the introduction of the balls 5—5, I provide in the outer wall $3^a$ of the sleeve 3 a ball passage which connects with the ball race. When the balls are absent, the head 2 may be readily inserted in or withdrawn from the outer end of the sleeve, but when in place the two ball race grooves will register so that at such time the balls 5—5 may be introduced through this side opening. When the ball race is filled, this side opening may be closed by means of a screw plug 7 (see Fig. 7). Since the jaws 1—1 cannot rotate relatively to the driver 4, to adjust the chuck it is merely necessary to rotate the sleeve 3 and head 2 up and down in the driver. Inasmuch as in the preferred form the opening through the head 2 is such that said head cannot rotate independently of the jaws, it follows that in the absence of an efficient anti-friction connection between the head and sleeve, great resistance would be offered to the clamping of a tool. The presence of the anti-friction bearing balls 5—5 practically eliminates this friction, with the result that by the use of the hand alone, the chuck may be operated so as to grip a tool very tightly between the jaws 1—1. By this special arrangement the balls also take the end thrust in both directions of the head 2 in sleeve 3, thus facilitating both the clamping and unclamping of the jaws 1—1.

What I claim is:

1. In a chuck, a driver, jaws carried thereby, an operating sleeve having a screw-threaded connection with said driver, a head through which the outer ends of the jaws pass, inclines on one of said parts to cause said jaws to contract as the operating sleeve is turned down on the driver, and a single series of anti-friction balls arranged between the head and said sleeve and extending partly into each part and operating to both prevent longitudinal displacement in both directions and afford easy action.

2. In a chuck, a driver, jaws carried thereby, an operating sleeve having a screw-threaded connection with said driver, a head through which the outer ends of the jaws pass and operating to contract the outer ends of said jaws as the same are moved outwardly relatively thereto, and a single series of anti-friction balls operating as the sole connector for the head and operating sleeve said balls being arranged to take end thrust in both directions of one part relatively to the other.

3. In a chuck, a driver, jaws carried thereby, an operating sleeve mounted upon said driver for longitudinal adjustment, a head revolubly mounted in the outer end of said sleeve, a single series of balls located in a race-way formed partly in said head and partly in the surrounding portion of the sleeve, said balls operating as the sole connecting means between said parts but permitting said parts to revolve independently, a ball entrance in the sleeve communicating with said ball-race, and a closure for said ball entrance.

4. In a chuck, a driver, jaws carried thereby, an operating sleeve mounted upon said driver for longitudinal adjustment, a head revolubly mounted in the outer end of said sleeve, a single series of balls located in a race-way formed partly in said head and partly in the surrounding portion of the sleeve, said balls operating as the sole connection between said parts but permitting said parts to revolve independently, a ball entrance in the sleeve communicating with said ball-race, and a closure for said ball entrance, that part of said sleeve surrounding said ball-race being enlarged to provide a grip of greater diameter than the diameter of the balance of the sleeve.

5. In a chuck, a driver, jaws carried thereby, an operating sleeve, a head through which the outer ends of said jaws pass, one of said last two parts overlapping the other, one of said parts having an annular groove, the other of said parts having an annular groove corresponding with the first but facing up oppositely thereto, both of said grooves constituting a ball-race, a plurality of balls in a single series arranged in said race and operating as the sole connection between said sleeve and head to prevent endwise displacement of one relatively to the other but permitting said parts to revolve freely independently of each other.

JOSEPH PEEK BARTHOLOMEW.

Witnesses:
CHAS. W. NICHOLS,
WILLIAM J. WORAM.